United States Patent [19]
Hwang

[11] Patent Number: 5,498,013
[45] Date of Patent: Mar. 12, 1996

[54] BICYCLE FRAME HAVING SHOCK ABSORBING DEVICE

[76] Inventor: Chiuon T. Hwang, 5F No. 13 Lane 264, Jing De Road, An Chiuan Village, Shin Juang City, Taipei County, Taiwan

[21] Appl. No.: 354,253

[22] Filed: Dec. 12, 1994

[51] Int. Cl.[6] .................................................. B62K 3/02
[52] U.S. Cl. ........................................ 280/283; 280/281.1
[58] Field of Search ................................ 280/281.1, 283, 280/284, 286

[56] References Cited

FOREIGN PATENT DOCUMENTS 356881  10/1905  France .................................. 280/283
7141  of 1899  United Kingdom ................... 280/283

*Primary Examiner*—Mitchell J. Hill
*Attorney, Agent, or Firm*—Morton J. Rosenberg; David I. Klein

[57] ABSTRACT

A bicycle frame includes a front frame having a bottom bracket secured to the bottom portion. A middle frame is pivotally coupled to the bottom bracket and is rotatable relative to the front frame. A chain stay has one end pivotally coupled to the bottom bracket and has the other end coupled to the middle frame by a shock absorbing device. Another shock absorbing device is secured between the front frame and the middle frame so as to allow relative movement between the middle frame and the front frame and so as to absorb shocks transmitted between the middle frame and the front frame.

3 Claims, 4 Drawing Sheets

BICYCLE FRAME HAVING SHOCK ABSORBING DEVICE

BACKGROUND OF THE INVENTION

1. Field of the Invention

The present invention relates to a bicycle frame, and more particularly to a bicycle frame having shock absorbing device.

2. Description of the Prior Art

Typical bicycle frames comprise a top tube, a head tube, a down tube, a seat tube and a chain stay solidly fixed together. Typical shock absorbing means are provided for securing to suitable portions of the bicycle frames for absorbing shocks and vibrations that may be transmitted to the riders. However, the whole bicycle frame includes an integral configuration, when the shock absorbing means is secured to the front portion of the bicycle frame, the rear portion of the bicycle also has no shock absorbing effects. On the contrary, when the shock absorbing means is secured to the rear portion of the bicycle frame, the front portion of the bicycle also has no shock absorbing effects.

The present invention has arisen to mitigate and/or obviate the afore-described disadvantages of the conventional bicycle frames.

SUMMARY OF THE INVENTION

The primary objective of the present invention is to provide a bicycle frame which includes a number of portions having shock absorbing means coupled therein so as to allow relative movements between the portions.

In accordance with one aspect of the invention, there is provided a bicycle frame comprising a head tube, a top tube including a first end fixed to the head tube and including a second end, a down tube including a first end fixed to the head tube and including a second end having a bottom bracket secured thereto, a seat tube including a lower end pivotally coupled to the bottom bracket at a first pivot axle, a seat stay including a first end portion fixed to the seat tube so as to form a middle frame, and the seat stay including a second end, the middle frame being rotatable relative to the bottom bracket about the first pivot axle, a chain stay including a first end pivotally coupled to the bottom bracket at a second pivot axle and including a second end, the chain stay being rotatable relative to the bottom bracket about the second pivot axle, a first shock absorbing means secured between the second end of the top tube and the middle frame so as to allow the middle frame to rotate relative to the bottom bracket about the first pivot axle and so as to absorb shocks transmitted between the middle frame and the top tube and the down tube, and a second shock absorbing means secured between the second end of the seat stay and the second end of the chain stay so as to allow relative movement between seat stay and the chain stay and so as to absorb shocks transmitted between the middle frame and the chain stay.

The bottom bracket includes a block fixed on top thereof and a coupler pivotally coupled to the block, the block includes a recess eccentrically formed therein, the coupler includes a lug pivotally secured in the recess at the second pivot axle, the coupler is fixed to the bottom end of the seat tube such that the seat tube is rotatable about the bottom bracket at the second pivot axle.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
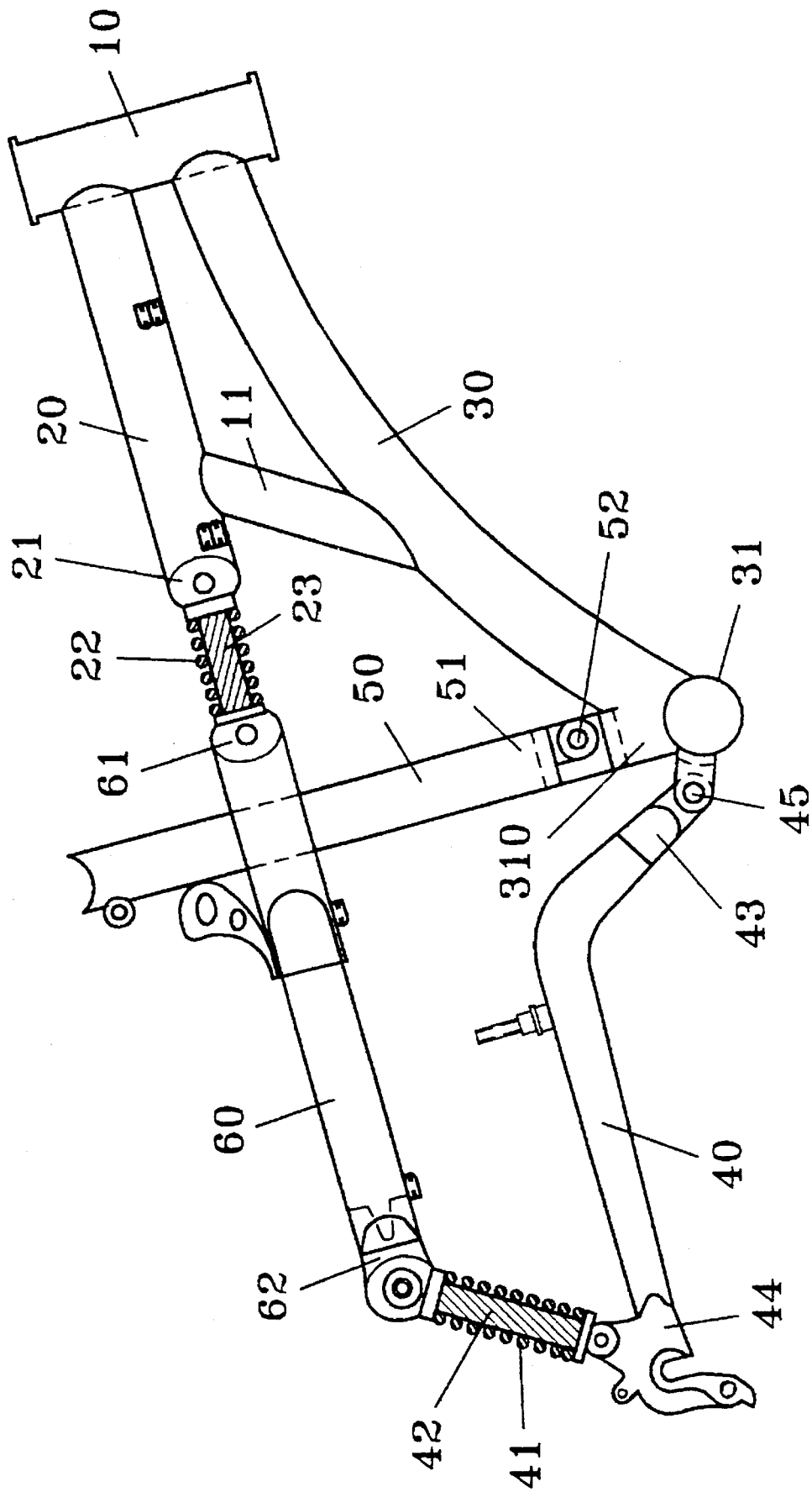
FIG. 1 is a plane schematic view of a bicycle frame in accordance with the present invention.
Figure 2:
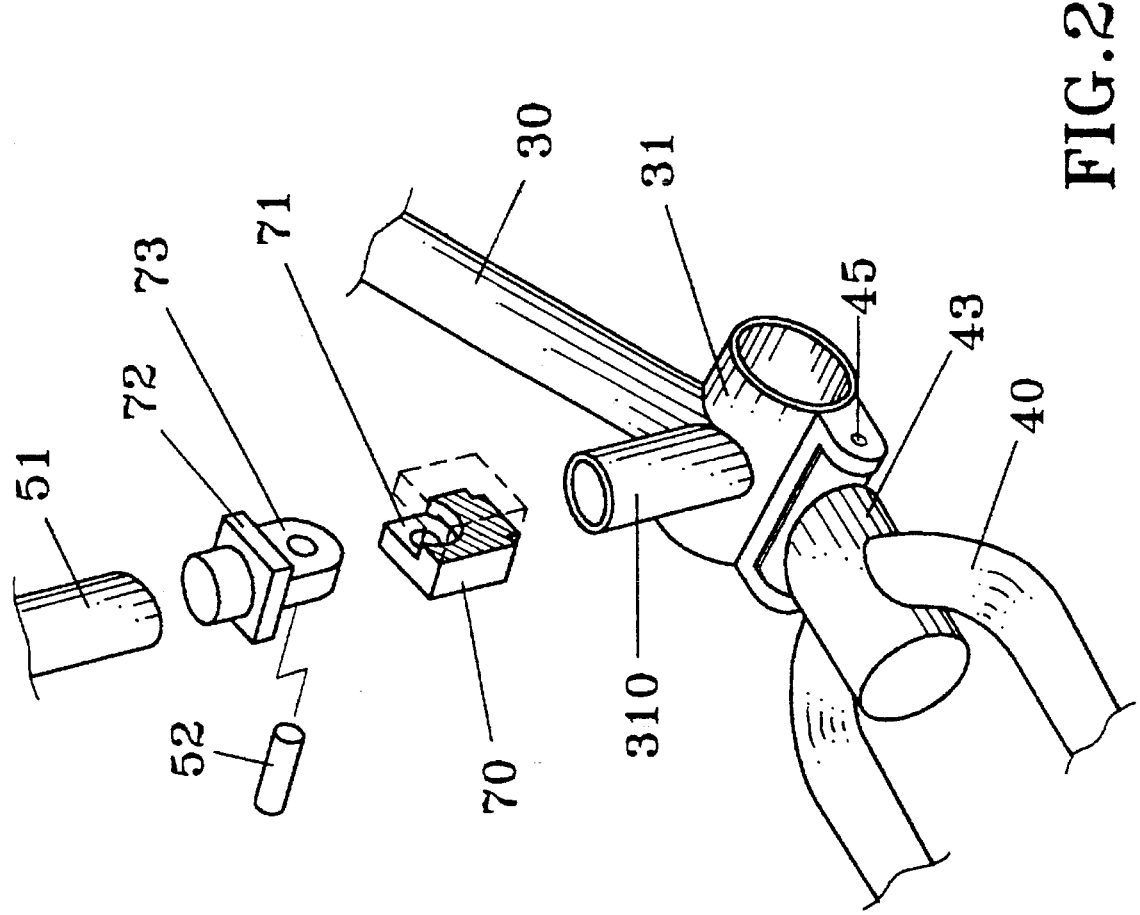
FIG. 2 is a partial exploded view of the bicycle frame.

Referring to the drawings, and initially to FIGS. 1 and 2, a bicycle frame in accordance with the present invention comprises a top tube 20 and a down tube 30 having one end fixed to a head tube 10. A reinforcing beam 11 is secured between the top tube 20 and the down tube 30 such that the top tube 20, the head tube 10 and the down tube 30 form an integral front frame. The down tube 30 includes a bottom portion having a bottom bracket 31 secured thereto. A seat tube 50 has a lower end 5 1 pivotally coupled to the bottom bracket 31 at a pivot axle 52. A seat stay 60 is arranged in line to the top tube 20 and fixed to the seat tube 50 such that the seat stay 60 and the seat tube 50 form an integral middle frame. A chain stay 40 includes a front end 43 pivotally coupled to the bottom bracket 31 at a pivot axle 45 and includes a rear end 44.

The bicycle frame in accordance with the present invention further comprises two shock absorbing means engaged between the front frame and the middle frame and engaged between the middle frame and the chain stay respectively. One of the shock absorbing means includes a resilient rod 23 and a spring 22 secured between the rear end 21 of the top tube 20 and the front end 61 of the seat stay 60. The resilient rod 23 is made of soft and resilient materials, such as rubber, such that the middle frame may rotate relative to the front frame about the pivot axle 52. Another shock absorbing means includes a resilient rod 42 and a spring 41 secured between the rear end 62 of the seat stay 60 and the rear end 44 of the chain stay 44 such that the middle frame may rotate and may move relative to the chain stay 40.

As best shown in FIG. 2, the bottom bracket 31 includes a stub 310 extended upward therefrom. A block 70 is fixed on top of the stub 310 by such as welding processes and includes a recess 71 formed in one corner area of the block 70 or formed eccentrically in the block 70. A coupler 72 includes a lug 73 rotatably engaged in the recess 71 and pivotally coupled to the block 70 at a pivot axle 52. The coupler 72 is fixed to the bottom end 51 of the seat tube 50, such that the middle frame including the seat tube 50 and the seat stay 60 may be rotated relative to the front frame at the pivot axle 52.

Figure 3:
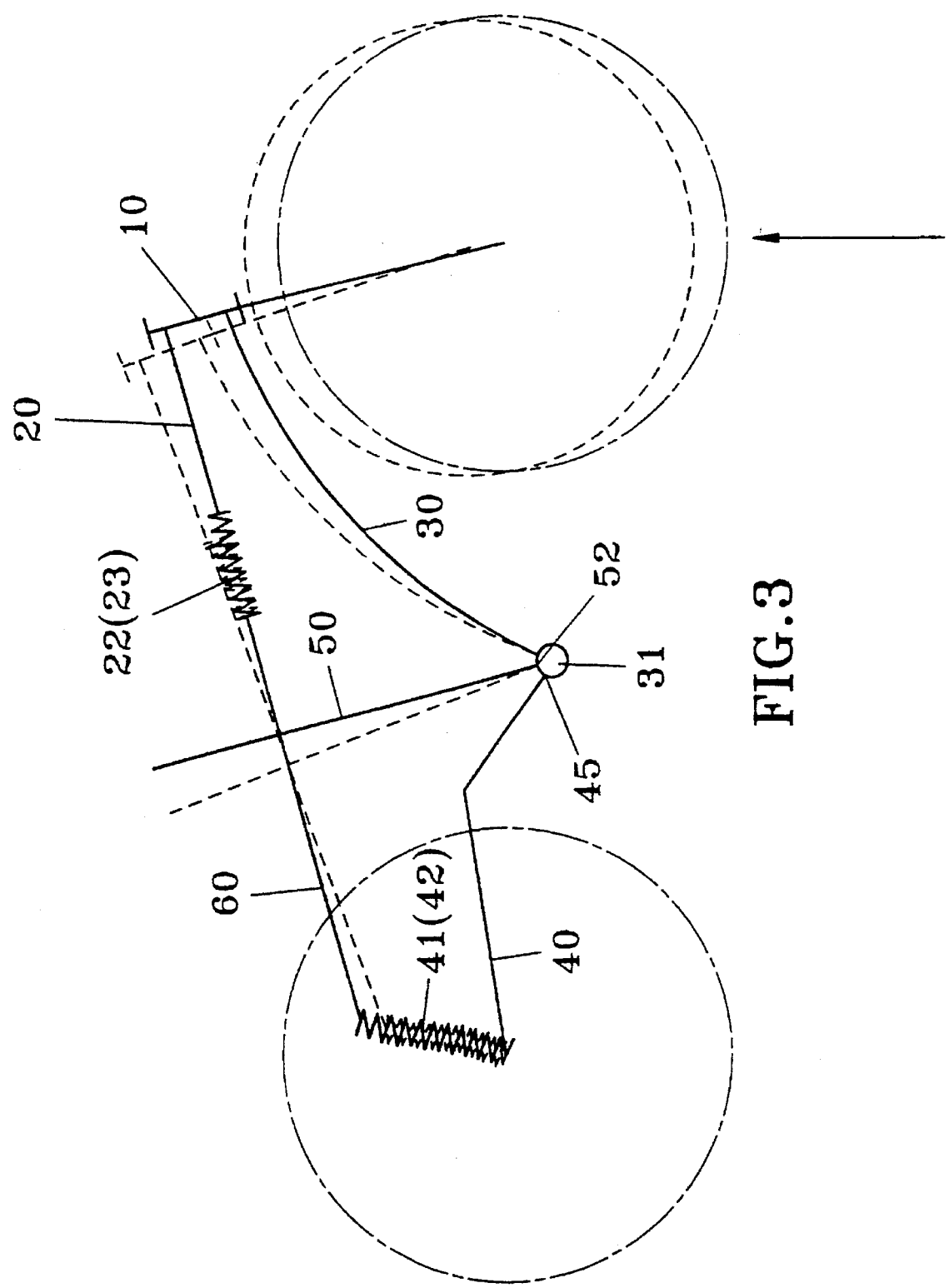
FIGS. 3 and 4 are schematic views illustrating the operation of the bicycle frame.

In operation, as shown in FIG. 3, when a force or a shock is transmitted to the front wheel, the front frame 10, 20, 30 may rotate relative to the middle frame 50, 60 at the pivot axle 52 and may rotate relative to the chain stay 40 at the pivot axle 45, and the middle frame 50, 60 may also move or rotate relative to the chain stay 40 such that the shock absorbing means 22, 23, 41, 42 may absorb the shocks transmitted to the bicycle frame.

Figure 4:
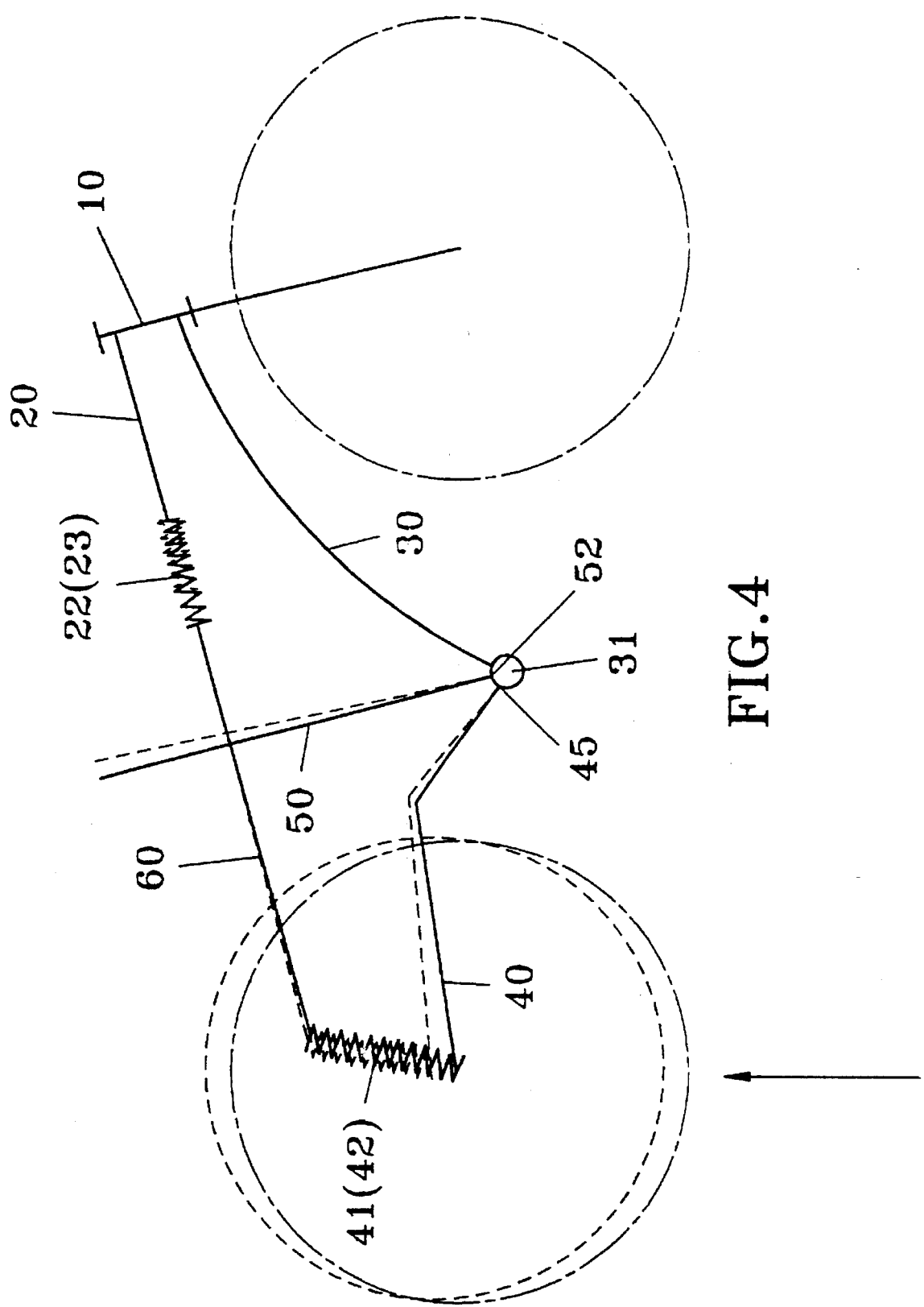

On the contrary, as shown in FIG. 4, when a force or a shock is transmitted to the rear wheel, the chain stay 400 may rotate relative to the middle frame 50, 60 and the middle frame 50, 60 may also rotate relative to the front frame 10, 20, 30 such that the shock absorbing means 22, 23, 41, 42 may absorb the shocks transmitted to the bicycle frame.

Accordingly, the bicycle frame in accordance with the present invention includes a number of portions having shock absorbing means coupled therebetween so as to allow relative movements between the portions and so as to absorb shocks transmitted to the bicycle frame.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A bicycle frame comprising:

a head tube, a top tube including a first end fixed to said head tube and including a second end, a down tube including a first end fixed to said head tube and including a second end having a bottom bracket secured thereto, a seat tube including a lower end pivotally coupled to said bottom bracket at a first pivot axle, a seat stay including a first end portion fixed to said seat tube so as to form a middle frame, and said seat stay including a second end, said middle frame being rotatable relative to said bottom bracket about said first pivot axle, a chain stay including a first end pivotally coupled to said bottom bracket at a second pivot axle and including a second end, said chain stay being rotatable relative to said bottom bracket about said second pivot axle, a first shock absorbing means secured between said second end of said top tube and said middle frame so as to allow said middle frame to rotate relative to said bottom bracket about said first pivot axle and so as to absorb shocks transmitted between said middle frame and said top tube and said down tube, and a second shock absorbing means secured between said second end of said seat stay and said second end of said chain stay so as to allow relative movement between seat stay and said chain stay and so as to absorb shocks transmitted between said middle frame and said chain stay.

2. A bicycle frame according to claim 1, wherein said bottom bracket includes a block fixed on top thereof and a coupler pivotally coupled to said block, said block includes a recess eccentrically formed therein, said coupler includes a lug pivotally secured in said recess at said second pivot axle, said coupler is fixed to said bottom end of said seat tube such that said seat tube is rotatable about said bottom bracket at said second pivot axle.

3. A bicycle frame comprising:

a front frame;

a middle frame pivotally coupled to said front frame;

a chain stay pivotally coupled to said front frame;

first shock absorbing means secured between said front frame and said middle frame for allowing relative movement and absorbing shocks transmitted therebetween, said first shock absorbing means including a first rod member formed of a soft and resilient material secured between said front frame and said middle frame and a first spring member disposed concentrically around said first rod member; and second shock absorbing means secured between said middle frame and said chain stay for allowing relative movement absorbing shocks transmitted therebetween, said second shock absorbing means including a second rod member formed of a soft and resilient material secured between said middle frame and said chain stay and a second spring member disposed concentrically around said second rod member.

\* \* \* \* \*